United States Patent
Van Duijneveldt

(10) Patent No.: US 7,854,539 B2
(45) Date of Patent: Dec. 21, 2010

(54) ILLUMINATION DEVICE COMPRISING A LIGHT SOURCE AND A LIGHT-GUIDE

(75) Inventor: Wido Van Duijneveldt, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 153 days.

(21) Appl. No.: 12/374,320

(22) PCT Filed: Jul. 5, 2007

(86) PCT No.: PCT/IB2007/052626

§ 371 (c)(1),
(2), (4) Date: Jan. 19, 2009

(87) PCT Pub. No.: WO2008/017968

PCT Pub. Date: Feb. 14, 2008

(65) Prior Publication Data

US 2009/0231878 A1   Sep. 17, 2009

(30) Foreign Application Priority Data

Aug. 9, 2006 (EP) .................................. 06118651

(51) Int. Cl.
*H01L 33/00* (2010.01)
(52) U.S. Cl. ........................ 362/555; 362/609; 362/612; 362/628
(58) Field of Classification Search ................. 362/551, 362/555, 609, 610, 612, 628; 385/123, 146, 385/901
See application file for complete search history.

(56) References Cited

U.S. PATENT DOCUMENTS

| 5,485,291 | A  | * | 1/1996  | Qiao et al. ..................... 349/62 |
| 5,799,126 | A  | * | 8/1998  | Nagatani et al. ............. 385/146 |
| 6,357,903 | B1 | * | 3/2002  | Furusawa et al. ........... 362/555 |
| 7,109,450 | B2 | * | 9/2006  | Kaji et al. .................... 219/620 |
| 7,386,214 | B1 | * | 6/2008  | Cianciotto .................. 385/133 |
| 7,416,313 | B2 | * | 8/2008  | Westphal et al. ....... 362/249.07 |
| 2004/0137189 | A1 | * | 7/2004 | Tellini et al. ................ 428/64.4 |
| 2005/0084210 | A1 | * | 4/2005 | Cha ............................. 385/31 |
| 2006/0187542 | A1 | * | 8/2006 | Westphal et al. ............ 359/389 |
| 2007/0258265 | A1 | * | 11/2007 | Lee et al. ..................... 362/612 |
| 2008/0239747 | A1 | * | 10/2008 | Ito et al. ..................... 362/551 |

* cited by examiner

*Primary Examiner*—Ali Alavi

(57) ABSTRACT

Proposed is an illumination device (1), comprising a semiconductor light source (10) for generating light, a primary optical system (20) for feeding the light to a secondary optical system (30), which is provided for radiating the light and for achieving a desired radiation pattern. The semiconductor light source may comprise LEDs and/or Laser-Diodes. The primary optical system comprises a light-guide with a mirrored end-face (24) and an out-coupling structure (25) for directing light into the secondary optical system. The mirrored end-face optically folds the light-guide, effectively extending the length over which the light is advantageously homogenized inside the light guide. Furthermore, optically folding the light-guide makes more economical use of the space inside the secondary optical system. This is especially advantageous when designing an LED based retrofit for existing form factors of halogen based illumination devices.

10 Claims, 2 Drawing Sheets

ILLUMINATION DEVICE COMPRISING A LIGHT SOURCE AND A LIGHT-GUIDE

This application is a national stage application under 35 U.S.C. §371 of International Application No. PCT/IB2007/052626 filed on Jul. 5, 2007, and published in the English language on Feb. 14, 2008, as International Publication No. WO/2008/017968, which claims priority to European Application No. 06118651.6, filed on Aug. 9, 2006, incorporated herein by reference.

FIELD OF THE INVENTION

The invention relates to an illumination device comprising a semiconductor light source means, a primary optical system comprising a light-guide having a first end-portion, a second end-portion, an optical axis extending between the first and second end-portions, and an out-coupling structure located between the first and second end-portions for out-coupling light, the light source means being arranged for coupling light into the first end-portion, a secondary optical system, the light-guide being arranged to direct out-coupled light into the secondary optical system for achieving a desired light radiation pattern. Such an illumination device is especially dimensioned for replacing a conventional illumination device using an incandescent-, halogen-or gas-discharge bulb or burner.

BACKGROUND OF THE INVENTION

An embodiment of an illumination device of the kind set forth is known from application WO2006054199. That document discloses a light source comprising a light engine, especially with at least one semiconductor light-emitting element like an LED and/or a Laser-Diode, and a light-guide as a primary optical system, which is retrofit so that it can be used in combination with a conventional secondary optical system like a reflector and/or a lens which is designed especially for the above mentioned conventional light sources and can substitute these without substantially degrading the radiation pattern characteristics.

The advantage of this approach lies in the fact that known secondary optical systems can be applied in combination with the enhanced performance of LEDs relative to conventional light sources, such as longer lifetime and lower energy consumption. Furthermore, the complete device can be fabricated in a conventional form factor, e.g. a low-voltage halogen PAR or dichroic reflector lamp.

However, one characteristic of the final light radiation pattern not covered by WO2006054199 is the color homogeneity in case a multitude of light-emitting elements are used, each with a different color. Color homogeneity is quite important for high quality lighting because the human eye is very sensitive for color differences between two points at close range. The problem especially exists when utilizing a multi-color array of LED chips for producing white light in a device with beam generating optics. An example of such a device would be a retrofit for a white light emitting halogen-based illumination device—such as a 50 mm diameter dichroic parabolic reflector lamp with a GU5.3 base—in which the array comprises a red, green and blue LED. It is then quite evident that the origin of the red, green and blue light is spatially separated. This spatial separation then becomes evident in the radiation pattern of the device if special precautions to mix these different colors are not taken.

Several solutions have been proposed to solve the mixing problem, but they all have the disadvantage that one or more criteria are sacrificed, such as: the size of the luminary, the angular width of the beam or the overall efficiency. Furthermore, some mixing solutions have very stringent alignment requirements.

One such well-known solution for the mixing problem is a light-guide. Such a 'mixing rod' has the advantage that it preserves the angular width of the beam (in combination with additional optics for collimation) as well as the overall efficiency of a device. However, the disadvantage of these mixing rods lies in the fact that good color mixing requires a large length over thickness ratio. Decreasing the thickness of the light-guide can increase the length to thickness ratio. However this will also decrease the in-coupling efficiency and thus the overall efficiency of the device. The alternative is an increase in length of the light-guide. However this is at odds with the object of the device disclosed in WO2006054199 to realize the illumination device in existing lamp form factors. Since the focal point of a parabolic reflector is located near the base of the reflector cup and the out-coupling structure of the light-guide has to be placed in that focal point, the obvious solution for an improvement of the homogeneity would be an extension of the light-guide to the rear of the reflector and into the base. Yet the length of the base is fixed, given the existing form factors.

SUMMARY OF THE INVENTION

It is an object of the present invention to provide an illumination device of the kind set forth, in which a good mixing of the light is performed with a light-guide that is sufficiently short to fit into existing lamp form factors. This object is achieved with the illumination device according to the invention as defined in claim 1. The illumination device comprises a semiconductor light source means, a primary optical system comprising a light-guide having a first end-portion, a second end-portion, an optical axis extending between the first and second end-portions, and an out-coupling structure located between the first and second end-portions for out-coupling light, the light source means being arranged for coupling light into the first end-portion, a secondary optical system, the light-guide being arranged to direct out-coupled light into the secondary optical system for achieving a desired light radiation pattern, wherein the second end-portion of the light-guide has a mirrored end-face.

The invention provides a narrow beam illumination device that has the desired compactness of existing lamp form factors, like a PAR lamp, with the ability to vary and control color and power.

By applying a mirror to the second end-portion of the light-guide, the light is reflected back into the light-guide, effectively lengthening the traversed path of the light inside the light-guide. From an optical point of view, the light-guide is folded through the application of a mirror to its end face. A considerable advantage of the above-described solution is the more economical use of the space inside the secondary optical system. This creates effectively the extended length that otherwise necessarily would have been protruded to the rear.

In an embodiment of the present invention the homogeneity of the light radiation pattern is further increased by providing an illumination device where the light-guide has a polygonal cross section orthogonal to the optical axis.

According to an embodiment of the present invention the illumination device comprises a light-guide wherein the first and second end-portions have different transverse polygonal cross sections.

In an embodiment of the illumination device according to the invention the first and second end-portions each have a transverse cross sectional area, characterized in that the cross sectional area of the second end-portion is larger than the cross sectional area of the first end-portion.

In an embodiment of the invention the ratio of the transverse cross sectional area of the second and first end-portions is larger than 2. Preferably this ratio is larger than 9.

In an embodiment the first and second end-portions enclose a transition portion, said transition portion has an outer-surface, said outer surface and the optical axis enclosing an angle (α) smaller than 90°.

In an embodiment the transition portion has an outer-surface, the outer-surface being chosen from the group consisting of conical and facetted surfaces.

According to an embodiment the out-coupling structure is located in the transition portion and extends over at least a part of the circumference of the light-guide. For an optimal efficiency of the illumination device it is preferred that the out-coupling structure is arranged for coupling the light out substantially transverse to the optical axis.

This can be achieved advantageously in that the out-coupling structure has a surface coated with a reflective layer. Alternatively, the out-coupling structure may have a surface with a texture for emitting diffuse light.

In an embodiment the out-coupling structure extends over a volume of the transition portion, said volume comprising a diffusively scattering material. Alternatively, the volume of the transition portion comprises a holographic grating.

These and other aspects of the invention will be apparent from and elucidated with reference to the embodiments described hereinafter.

BRIEF DESCRIPTION OF THE DRAWINGS

Further details, features and advantages of the invention are disclosed in the following description of exemplary and preferred embodiments in connection with the drawings.

DETAILED DESCRIPTION OF THE EMBODIMENTS

Figure 1:
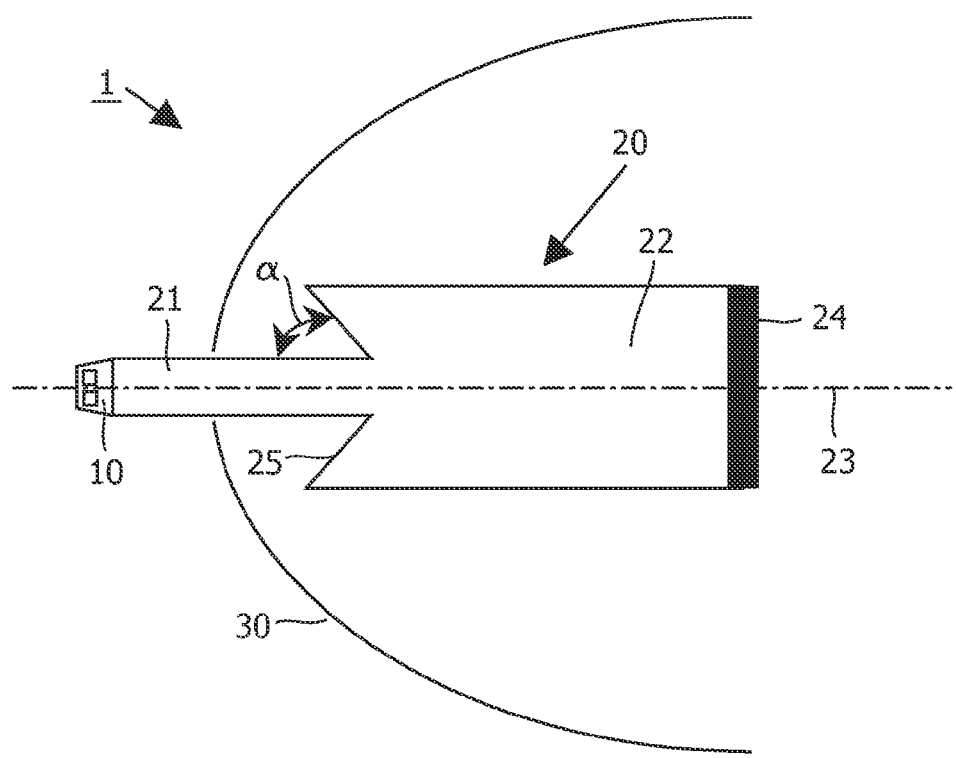
FIG. 1 is a longitudinal cross section through a first embodiment of an illumination device.

FIG. 1 shows a longitudinal cross section through a first embodiment of an illumination device 1 according to the invention. The illumination device comprises a semiconductor light source 10 for generating light, a primary optical system 20 for feeding the light to a secondary optical system 30, which is provided for radiating the light and for achieving a desired radiation pattern.

The semiconductor light source 10 comprises at least one light-emitting element, like e.g. a LED or a Laser-Diode.

The primary optical system 20 comprises a light-guide with a first end-portion 21, a second end-portion 22, an optical axis 23 extending between the first and second end-portions, a mirrored end-face 24 and an out-coupling structure 25 located between the first and second end-portions for directing out-coupled light into the secondary optical system 30.

The secondary optical system 30 comprises of a reflector and/or a lens system, designed to achieve a desired light radiation pattern. Preferably the out-coupling structure 25 is positioned in the focal area of this secondary optical system.

The light generated by the light source 10 is advantageously positioned outside the secondary optical system 30, so that a heat sink (not shown) can be easily applied to extract excess energy from the LEDs without obstructing the optical function of the secondary optical system 30. The light generated by the LEDs is collimated by applying standard optical elements (not shown) and directed to the first end-portion 21 of the light-guide in such a way that it is within the TIR angle of the light-guide.

The light source 10 may contain different colored LEDs or Laser-Diodes, for instance red, green, blue and amber LEDs, to create an adjustable color (or temperature-temperature white) light. Alternatively, the light source 10 may contain phosphor-coated LEDs. It is quite evident that the origin of the red, green, blue and amber light is spatially separated. As a consequence, one has to take special precautions to mix these different colors to form a homogeneous radiation pattern. It is well known that a light-guide, made of a transparent material with an index of refraction larger than 1, can perform this mixing function. Glass and plastics, such as polymethylmetacrylate (PMMA) or polycarbonate (PC), are well known to be suitable materials. Also well known is that the mixing of the light is improved with an increased light-guide length.

Since the focal point of the secondary optical system 30 (e.g. a parabolic, segmented or hyperbolic reflector), is located near its base and the out-coupling structure of the light-guide has to be placed in that focal point, the obvious solution for an improvement of the homogeneity would be an extension of the light-guide to the rear of the secondary optical system.

If one wants to realize an LED based illumination device using a light-guide as a mixing rod in an existing lamp form factor, such as a Philips Standard Line 50 mm diameter dichroic parabolic reflector lamp with a GU5.3 base (not shown), this form factor sets boundary conditions for the overall length of the device. Extension of the light-guide to the rear of the secondary optical system is then at odds with the boundary conditions of the design objective.

By applying a mirror to the end-face 24 of the second end-portion 22 of the light-guide, the light is reflected back into the light-guide, effectively lengthening the traversed path of the light inside the light guide. A coating of silver or aluminum could be provided at the end face 24 to construct the mirror. Alternatively, a multilayer stack with an alternating high/low refractive index forming an interference coating can be used.

As a consequence of the application of the mirror the number of TIR-reflections at the sidewalls of the light-guide is increased before the light is coupled out. This will result in an improved homogeneity of the light beam radiated from the device. A considerable advantage of this solution is the more economical use of the space inside the secondary optical system 30.

Consider for example the above-mentioned Philips Standard Line lamp. The overall length of this device, from the front of the cup to the back of the electrical connection pins is 53 mm. Moreover, the distance between the front of the reflector cup and the base of the reflector is 30 mm. This leaves the designer just over 20 mm of distance between the focal point of the parabolic reflector and the back-end of the lamp to accommodate the light-guide. Moreover, it is noted that this length is usually reduced due to the allocation of the LEDs, a heat sink, control electronics and in-coupling optics. On the other hand, it was found that a linear mixing rod according to the disclosure in WO2006054199 needs a length of at least 30 mm for an acceptable homogeneity.

In an embodiment of an illumination device of the kind set forth, the light-guide would have a total length of 20 mm with an out-coupling structure at about the mid point. Due to the application of the mirror at the end-face of the second end-portion the optical length of the mixing rod totals 30 mm, of which about 20 mm is inside the reflector cup. However, the physical length inside the cup is only about 10 mm.

In view of the fact that the light-guide is located to a considerable extent inside the reflector cup, precautions have to be taken to prevent that the light-guide itself obstructs the light reflected from the secondary optical system. It is therefore preferred that the light is coupled out from the light-guide in a direction substantially orthogonal to the optical axis 23 of the light guide.

In order to optimize the efficiency of the illumination device, the amount of light extracted from the light-guide at the out-coupling structure 25 is preferably as large as possible. An ingenious way to realize this is by designing the light-guide with a first 21 and second 22 end-portion having a different transverse—i.e. orthogonal to the optical axis—cross sectional area so that there is a transition portion located between the two end-portions. Preferably the out-coupling structure 25 is located at this transition portion and extends over at least part of the circumference of the light-guide. If the transverse cross sectional area of the first end-portion of the light-guide is denoted by a, while A denotes the transverse cross sectional area of the second end-portion, the out-coupling efficiency scales with the ratio A/a. That is to say, if A=9a about 90% of the light coupled into the first end-portion of the light-guide will reach the out-coupling structure 25. Therefore, it is preferred that the ratio A/a is at least 2, or better still larger than 9.

Figure 2:
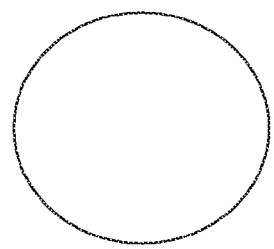
FIG. 2 shows a number of possible polygonal cross sections orthogonal to the optical axis of the light-guide.
Figure 2:
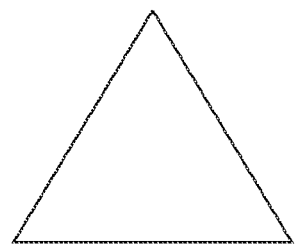
Figure 2:
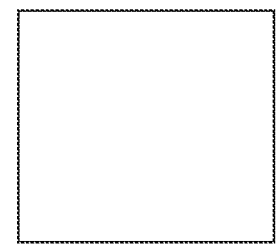
Figure 2:
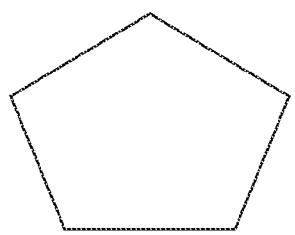
Figure 2:
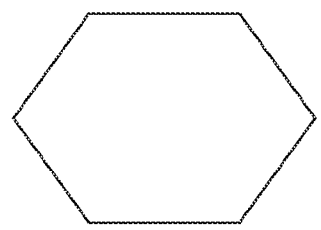

FIG. 2 shows a number of transverse cross sections of the light-guide. Although the cross section of the light-guide may be circular, preferably it has a non-round shape to further improve the mixing of the different light colors. The transverse cross section may have the shape of a triangle, a square, a pentagon, a hexagon or a higher polygon. Preferably the order of the polygon is lower than 12, as higher order polygons will mimic a circular cross section too closely, thereby diminishing the improvement in color mixing. The choice which polygon to use for the cross section of the light-guide is determined amongst others by the configuration of the LED chips in the light source 10. It was found that a pentagonal cross section was very suitable for mixing light of LED chips arranged at the corners of a square. It was also found that an additional advantage of the illumination systems of the kind set forth is that the optical alignment of the LEDs w.r.t. the optical axis 23 of the light-guide becomes less critical.

Especially in the case where the first 21 and second 22 end-portions of the light-guide have different transverse cross sectional areas, it is advantageous to have different polygonal cross sections for the two end-portions. The thicker end-portion preferably has a polygon of twice the order of the thinner end-portion polygon. The advantage lies in the ease with which the number of segments of surface of the transition portion can be designed, as they will then be polygons themselves. This can be discerned from FIG. 3, where a view along the optical axis 23 of the light-guide is given from the first end-portion 21 to the second end-portion 22. Here the first end-portion 21 is thinner and has a pentagonal cross-section, while the second thicker end-portion 22 has a decagonal cross-section. The segments of the surface of the transition portion are pentagons themselves in this case. Alternatively, the surface of the transition portion may be designed to have a conical surface.

Figure 3:
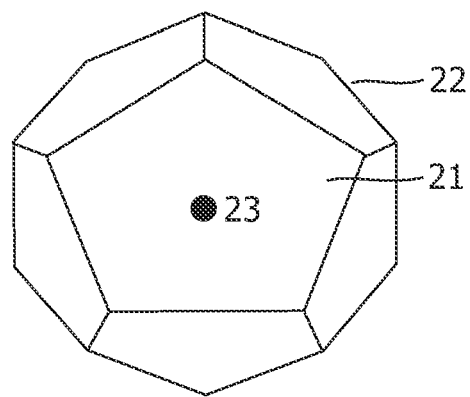
FIG. 3 shows a view along the optical axis of the light-guide from the first end-portion to the second end-portion.

In the later case where the transition portion has a conical surface, that surface encloses an angle $\alpha$ with the optical axis 23, as the cone is specified by its vertex angle. When the angle $\alpha$ is smaller than 90° the transition portion is concave, as in FIG. 4A. When the angle $\alpha$ is larger than 90° the transition portion is convex, as in FIG. 4B. With a facetted surface of the transition portion the vertex angle is not uniquely defined, because this surface does not have a $C_\infty$ symmetry. The angle $\alpha$ enclosed by the facetted surface and the optical axis 23 is range-bound, as can be discerned from the example presented in FIG. 3. While the vertex points of the pentagon in FIG. 3 are positioned in a single plane orthogonal to the optical axis 23, the vertex points of the decagon are not positioned in a single transverse plane. In fact, there are two groups of five vertex points positioned in two transverse planes. Therefore, a line crossing the optical axis 23 at a point V and lying in one of the facetted faces of the transition portion will form a maximum angle $\alpha$ when it is connected with one of the vertex points of the decagon in the transverse plane closed to the point V. Alternatively, a similar line will form a minimum angle $\alpha$ when it is connected with one of the vertex points of the decagon in the transverse plane furthest away from the point V. When discussing the angle $\alpha$ in conjunction with a facetted transition portion it is to be understood that the maximum angle is to be taken.

Figure 4A:
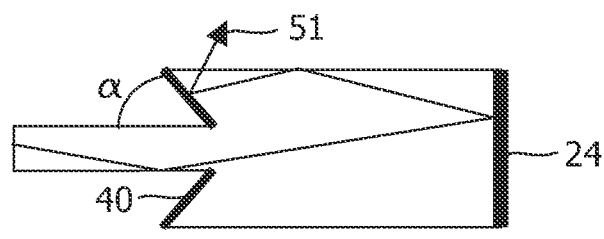
FIGS. 4A-D show schematically a number of longitudinal cross sections of the light-guide with different out-coupling structures.

FIGS. 4A to D show 4 different out-coupling structures 25. FIG. 4A shows an embodiment wherein the transition portion has an outer-surface, said outer surface and the optical axis enclosing an angle $\alpha$ smaller than 90°. In order to couple the light 51 out of the light-guide in a direction substantially orthogonal to the optical axis, the outer surface is coated with a reflective layer 40. As in the case of the end-face 24 of the second end-portion 22, this reflective layer could be made of silver, aluminum, an interference multilayer stack or any other highly reflective coating known in the art.

Figure 4B:
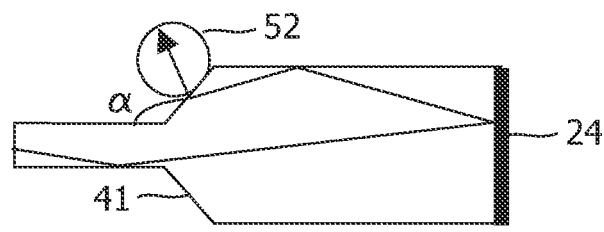

FIG. 4B shows an embodiment wherein the transition portion has an outer-surface, said outer surface and the optical axis enclosing an angle $\alpha$ larger than 90°. In this case the outer surface of the transition portion preferably has a texture 41 for emitting diffuse light 52 out of the light-guide. A diffusively emitting texture at the outer surface of the transition portion has, in the case $\alpha > 90°$, an advantage over a reflective coating. In the former case the light is coupled out of the light-guide directly. In the later case the light traverses the light-guide to the opposing side of the transition portion circumference. There the light can be reflected back into the light-guide, diminishing the out-coupling efficiency.

Figure 4C:
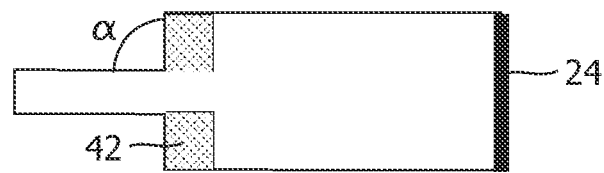
Figure 4D:
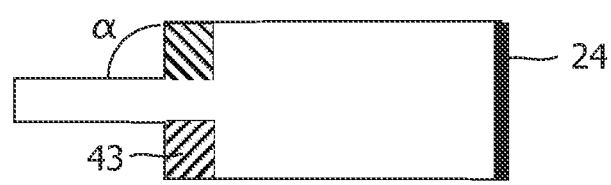

FIGS. 4C and 4D show embodiments wherein the transition portion has an outer-surface, said outer surface and the optical axis enclosing an angle $\alpha$ equal to 90°. Furthermore the Figures schematically show that instead of the outer surface of the transition portion forming the out-coupling structure, the out-coupling structure extends over a volume of the transition portion. The volume may comprise a diffusively scattering material 42—made f.i. of small particles, having a refractive index different from the host material, and dispersed throughout the volume of the transition portion of the light-guide. Alternatively the volume may comprise a holographic grating 43—made f.i. of a structure having a repetitive refractive index grating. It is advantageous to maximize the available volume of the out-coupling structure when using such volume based out-coupling structures. Therefore it is advantageous to combine such volume based out-coupling structures wherein the transition portion has an outer-surface, said outer surface and the optical axis enclosing an angle $\alpha$ equal to 90°.

Although the invention has been elucidated with reference to the embodiments described above, it will be evident that other embodiments may be alternatively used to achieve the same object. The scope of the invention is therefore not limited to the embodiments described above, but can also be applied to any other application device where a specific light radiation pattern is desired such as, for example, automotive head-lighting systems or display projection systems.

It should further be noted that use of the verb "comprises/comprising" and its conjugations in this specification, including the claims, is understood to specify the presence of stated features, integers, steps or components, but does not exclude the presence or addition of one or more other features, integers, steps, components or groups thereof. It should also be noted that the indefinite article "a" or "an" preceding an element in a claim does not exclude the presence of a plurality of such elements. Moreover, any reference sign does not limit the scope of the claims; the invention can be implemented by means of both hardware and software, and several "means" may be represented by the same item of hardware. Furthermore, the invention resides in each and every novel feature or combination of features.

The invention claimed is:

1. An illumination device, comprising:
   a primary optical system comprising a light-guide having:
   (i) a first end-portion,
   (ii) a second end-portion having a mirrored end-face, the first and second end-portions of the light-guide having different transverse polygonal cross sections,
   (iii) an optical axis extending between the first and second end-portions, and
   (iv) an out-coupling structure located between the first and second end-portions for out-coupling light,
   a semiconductor light source arranged for coupling light into the first end-portion, and
   a secondary optical system, the light-guide being arranged to direct the out-coupled light into the secondary optical system for achieving a desired light radiation pattern.

2. An illumination device according to claim 1, wherein the first and second end-portions each have a transverse cross sectional area, wherein the cross sectional area of the second end-portion is larger than the cross sectional area of the first end-portion.

3. An illumination device according to claim 2, wherein the ratio of the transverse cross sectional area of the second and first end-portions is larger than 2.

4. An illumination device according to claim 3, wherein the ratio of the transverse cross sectional area of the second and first end-portions is larger than 9.

5. An illumination device according to claim 2, wherein the first and second end-portions enclose a transition portion, said transition portion having an outer-surface, said outer surface and the optical axis enclosing an angle smaller than 90°.

6. An illumination device according to claim 5, wherein the transition portion has an conical or faceted outer-surface.

7. An illumination device according to claim 5, wherein the out-coupling structure is located in the transition portion and extends over at least a part of the circumference of the light-guide.

8. An illumination device according to claim 7, wherein the out-coupling structure is arranged for coupling the light out substantially orthogonal to the optical axis.

9. An illumination device according to claim 7, where the out-coupling structure has a surface coated with a reflective layer.

10. An illumination device according to claim 7, wherein the out-coupling structure has a textured surface for emitting diffuse light.

* * * * *